United States Patent [19]

Tsai et al.

[11] 3,976,509

[45] Aug. 24, 1976

[54] ELECTROLYTE COMPOSITIONS

[75] Inventors: Keh Chi Tsai, Saratoga; Ernest L. Littauer, Los Altos Hills, both of Calif.

[73] Assignee: Lockheed Missiles & Space Company, Inc., Sunnyvale, Calif.

[22] Filed: Apr. 4, 1975

[21] Appl. No.: 564,984

[52] U.S. Cl. .............................................. 136/154
[51] Int. Cl.² ......................................... H01M 6/04
[58] Field of Search ............... 136/6 F, 83 R, 154, 136/155; 252/62.2

[56] References Cited
UNITED STATES PATENTS

| | | | |
|---|---|---|---|
| 2,826,724 | 3/1958 | Lilienfeld | 252/62.2 |
| 3,692,584 | 10/1972 | King | 136/154 |
| 3,791,871 | 2/1974 | Rowley | 136/100 R |
| 3,833,420 | 9/1974 | Will | 136/6 F |

*Primary Examiner*—Donald L. Walton
*Attorney, Agent, or Firm*—Richard H. Bryer; Billy G. Corber

[57] ABSTRACT

In a reactive metal-water electrochemical cell, an alkaline electrolyte containing organic additives which reduce the parasitic direct corrosion reaction between the reactive metal and the water of the electrolyte. More particularly, the additives substantially reduce the activity of the water by forming inter-molecular hydrogen bonding between the organic additive and water. Illustratively, such organic additives include alcohols, nitrogen containing compounds such as amides, amines and hydrazine, and ketones, ethers and esters. Optionally, molarity of the electrolyte is controlled independent of water additions by chemically removing the reactive metal ions formed during discharge of the cell. This is accomplished by the controlled additions of precipitating agents to the electrolyte to form insoluble salts.

9 Claims, 4 Drawing Figures

ELECTROLYTE COMPOSITIONS

BACKGROUND OF THE INVENTION

This application describes and claims certain improvements in the basic electrochemical cell disclosed in U.S. Pat. No. 3,791,871 issued February 12, 1974.

The basic mechanism of operation of the cell described in the aforementioned patent is incorporated by reference in this application. Briefly, the cell utilizes a reactive metal anode highly reactive with water and spaced from a cathode by an electrically insulating film formed on the anode in the presence of water. The anode and cathode are immersed in aqueous electrolyte. In the embodiment shown in the aforementioned patent, the anode is formed of an alkali metal such as sodium or lithium and, during oeration of the cell, the electrolyte is a liquid solution in water of an alkali metal hydroxide. Alloys and compounds of the alkali metals and other reactive metals should be equally feasible for use as the anode, however, provided they are substantially as reactive with water as are sodium and lithium and further provided, in common with sodium and lithium, they form an insulatingfilm in the presence of water. The electrolyte is preferably an alkali metal hydroxide of the alkali metal utilized as the anode since such hydroxide is naturally formed during operation of the cell and hence automatically regenerates the electrolyte during operation. However, other alkaline electrolytes can be used to initially start up the cell or even during operation of the cell provided they permit the required anode-cathode reactions. Illustratively, potassium and ammonia hydroxide and alkali metal halides are feasible. After start up, these electrolytes will become replaced by the hydroxide of the anode metal unless subsequent additions of these electrolytes are made during operation of the cell.

Operation of the cell described in the aforementioned patent involves the following reactions, which, for illustrative purposes, utilize lithium as the ractive anode and lithium hydroxide as the electrolyte:

Anode Reaction
1. $Li \rightarrow Li^+_{(aq)} + e$   electrochemical dissolution
2. $Li^+_{(aq)} + OH^-_{(aq)} \rightarrow LiOH_{(aq)}$
3. $LiOH_{(aq)} \rightarrow LiOH_{(s)}$   formation of insulating film on anode
4. $Li + H_2O \rightarrow LiOH_{(aq)} + \frac{1}{2}H_2$   direct corrosion/parasitic reaction Cathode Reaction
5. $H_2O + e \rightarrow OH^- + \frac{1}{2}H_2$   reduction of water Where $(aq)$ represents an ion dissolved in water and $(s)$ represents a solid salt.

Reactions (1) and (5) are necessary for the generation of electricity. Reactions (2) and (3) serve to produce the porous insulating film which forms on the anode and protects it. Electrochemical reaction (1) occurs at the base of the flooded pores, the metal-solution interface. Simultaneous with the formation of the film, lithium hydroxide crystal sites at the film solution interface dissolve into the bulk electrolyte. In order for the electrochemical reaction to proceed at a given constant rate, a steady state situation must exist whereby the electrochemically produced film dissolves into the electrolyte at the same rate as it is formed. Therefore, the electrolyte must have the capacity to dissolve solid salts from the anodic film-electrolyte interface simultaneously with the formation of the salt at the lithium-film interface. If the film dissolves more slowly than it forms, it becomes increasingly thicker and less porous and the electrochemical reaction rate slows down and can approach zero. If the film dissolves more rapidly than it is formed, then a higher reaction rate will result due to the thinner, more porous film. Ultimately, the film could disappear and the lithium become unstable.

Reaction (3) requires a sufficiently high concentration of lithium hydroxide at or near the anode to cause precipitation of the film as solid lithium hydroxide on the lithium surface. If the electrolyte temperature is elevated or if the concentration of hydroxyl ions is low, then the liquid hydroxide of reaction (2) does not convert to the solid hydroxide of reaction (3). In the case where the cell is in an open circuit mode, the film is formed via the direct corrosion reaction (4). It is not known with certainty if the film which forms electrochemically is identical to the film which forms via reaction (4).

Reaction (4) generates no useful electrical current. Ideally, during discharge, there should be no reduction reaction at the anode surface so that the faradaic efficiency of the cell becomes 100 percent as all lithium is utilized in th generation of useful electrical current. Since water is required as a reactant only at the cathode, reaction (5), the problem becomes one of inhibiting the direct corrosion reaction (4) by reducing the chemical reactivity of water so as to inhibit the direct evolution of hydrogen at the anode without inhibiting hydrogen at the cathode.

As discussed in the aforementioned patent, it is necessary to maintain molarity of the electrolyte within certain limits for any specified operating condition. Since reaction (1) increases metal ion concentration of the electrolyte, molarity is adjusted by water additions to the cell. The excess electrolyte is either collected or disposed of into the environment. The cell, therefore, is particularly appropriate for a marine environment which can supply unlimited water and can absorb the reaction products. For nonmarine applications of the cell, it would be desirable to find an alternative technique for controlling molarity of the electrolyte.

A further disadvantage of the cell described in the aforementioned patent is its inefficiency at elevated temperatures. This is related to the higher solubility of the compound comprising the protective anodic film at high temperatures and also to the higher rate of the direct corrosion reaction (4) at high temperatures.

SUMMARY OF THE INVENTION

Briefly, in accordance with the invention, it has been discovered that the use of certain organic solvents in alkaline electrolytes permits the operation of reactive metal-water electrochemical cells at elevated temperatures, for example at 50°C, with high faradaic efficiency. This is accomplished by formation of an intermolecular hydrogen bond between the organic solvents and water which reduces chemical reactivity of the water in the electrolyte. This reduced reactivity is manifested by a lowered reaction rate when the reactive metal anode is inserted in the electrolyte. The direct corrosion, parasitic reaction between the anode and water is greatly diminished both at open circuit and during discharge. Improved anode surface smoothness is manifested because non-uniform corrosion is inhibited. This minimizes deterioration in power due to IR losses because good electrode contact is maintained during prolonged runs.

Heat production is reduced during operation of the cell because of the improved electrochemical efficiency. Hence, the need for cooling water is reduced. Because of the ability of the cell to operate at high temperatures, the need for cooling water is further reduced. Efficient operation of the cell is also achieved over a range of molarities and duration of cell operation is extended because of improved efficiency. The alkaline electrolytes permit the required anode-cathode reactions (1), (2), (3) and (5) previously discussed and have good conductivity. The electrolyte contains organic solvents which are capable of hydrogen bonding with water and which have only minor inhibiting influence on the required reactions. For example, heavy metals such as copper, zinc and cadmium, if present in the electrolyte, can deposit on the cathode and raise the hydrogen evolution overpotential. Naturally, the solvents should be stable under operating conditions of the cell, should not seriously detract from conductivity of the electrolyte, should have appreciable solubility in the electrolyte and, while not necessarily inert with respect to the anode, should react therewith at a slower rate than water does. Additional desirable but not required characteristics of the organic solvents would be their ability to act as corrosion inhibitors by absorbing onto bare anode sites and the further ability to have solubility for the metallic cations emanating from the discharge of the cell.

As will be discussed later in more detail, evaluation of organic solvents to ascertain whether they possess the preceding requisite characteristics can be readily and easily accomplished.

Within the following classes of compounds, many specific compounds have been identified as manifesting strong hydrogen bonding and other characteristics making them suitable for use for the purpose described herein: alcohols; nitrogen containing compounds including amides, amines and hyrazine; and ketones, ethers and esters.

It has been further discovered that molarity of the electrolyte can be controlled independent of water additions by chemically removing the reactive metal ions formed during discharge of the cell. This is accomplished by the addition of certain precipitation agents which form insoluble reactive metal salts. The salts may be filtered and removed from the electrolyte or recirculated as a suspension within the electrolyte. Additions of the agents to the electrolyte are made by monitoring the voltage or hydrogen evolution rate of the cell. A drop in voltage or hydrogen rate occurs as molarity becomes concentrated. Sufficient precipitation agent is then added to bring the voltage or hydrogen rate within the desired limits. Suitable precipitating agents for the reactive metal ions can be readily ascertained by one skilled in the art with the understanding that such agents should not interfere with the cell reaction and the function of the organic solvents previously discussed. Illustratively, typical precipitating agents are carbon dioxide, hydrofluoric acid and phosphoric acid. It is important that the agents be added to the bulk electrolyte so that precipitation does not occur at the anode and block the porous film.

BRIEF DESCRIPTION OF THE DRAWING

The invention may be more easily understood from the following description and accompanying drawing in which.

DESCRIPTION OF THE PREFERRED EMBODIMENTS

Figure 1:
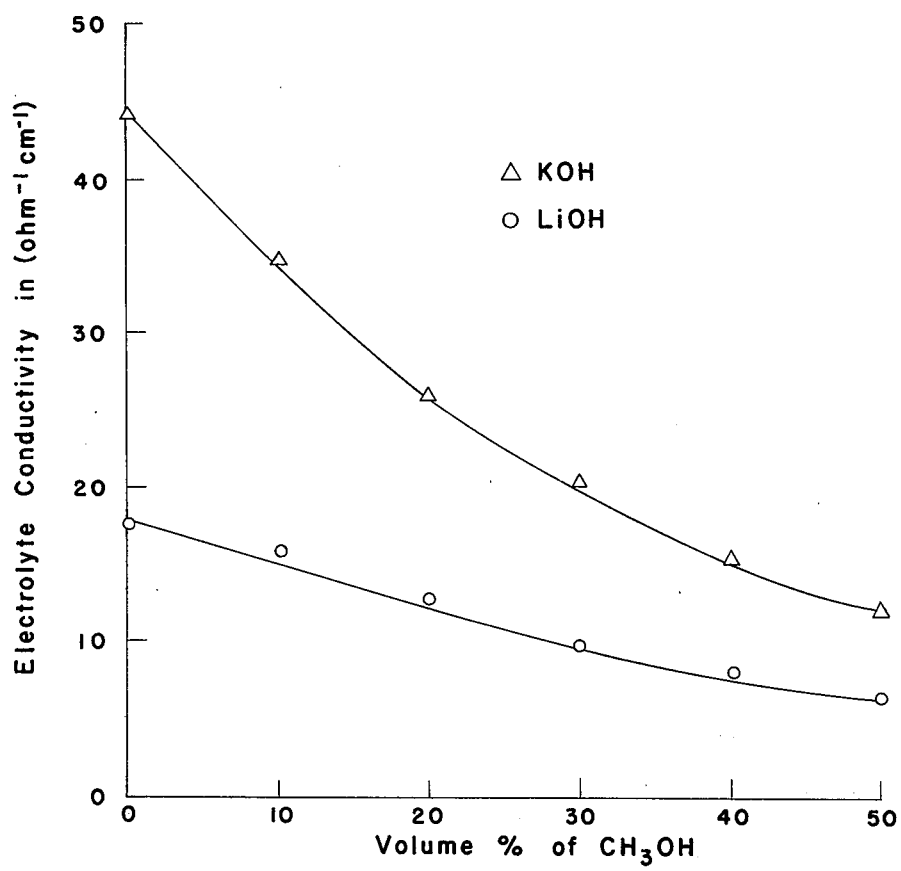
FIG. 1, on coordinates of conductivity expressed as reciprocal ohm centimeters ($ohm^{-1}cm^{-1}$) and volume percent methanol, is a plot showing electrolyte conductivity as a function of an organic solvent manifesting hydrogen bonding.

The alkaline electrolytes of the invention permit the required reactive metal anode-cathode reactions (1), (2), (3) and (5), previously discussed, and contain an organic solvent capable of hydrogen bonding with water and having only minor inhibiting influence on the required reactions. The activity of water, which is a corrosive reagent to reactive metals (reaction 4) is substantially reduced due to formation of inter-molecular hydrogen bonding between the organic solvent and water. The mechanism of hydrogen bonding is discussed by A. K. Covington and P. Jones, "Hydrogen-Bonded Solvent Systems," Taylor and Francis, Ltd., London, 1968 and W. J. Hamer, Ed., "The Structure of Electrolytic Solutions," John Wiley and Sons, Inc., New York, 1959. However, these articles do not consider the use of hydrogen bonding agents in relationship to alkali metals. Further, heretofore stability of such metals in aqueous solution has not been believed possible. The solvents of the invention react with the anode at a much slower rate than does water and can act as corrosion inhibitors by absorbing onto bare anode sites. It is the strong hydrogen bonding ability of the solvents, alone or in combination with the absorption effect, which results in the substantial reduction of the parasitic reaction of reactive metal anodes in alkaline electrolytes and, accordingly, the great improvement in the overall performance of reactive metal-water cells.

The particular organic solvents exhibiting the required characteristics can be readily ascertained by one skilled in the art. For example, applicants evaluated electrolyte additives in beaker-type electrochemical cells utilizing lithium as the anode and lithium hydroxide as the alkaline electrolyte. The tests were performed in two parts. In the first part, known weights of lithium were added to the electrolyte containing the test solvent and the time for total lithium dissolution was measured. This measurement gave an indication of the corrosion rates under open circuit conditions. For the second part of the test, a lithium anode-contiguous iron cathode couple was fabricated and immersed in the electrolyte. In a beaker the electrical leads from the cell couple were connected to a resistance through an ammeter. A voltmeter was connected across the cell. Polarizations were performed by changing the resistance values. The solvent set solvents in the following tables gave positive improvements by reducing the open circuit corrosion rate while manifesting acceptable electrochemical polarization behavior. These solvents are illustrative of the organic solvents suitable for use in the instant invention.

TABLE A — Alcohols

Methyl alcohol
Ethylene glycol
Glycerol
Ethly alcohol
Allyl alcohol
Propyl alcohol For alkaline metal hydroxide electrolyte solutions, the alcohols may be used alone or in combination, up to about 40 volume percent. This upper limit is dictated by degradation of conductivity and reduced solubility for the anodic reaction products. A lower concentration limit for effectiveness is from 5 to 10 volume percent of the alcohol. Below this limit, the extent of hydrogen bonding is inadequate and sufficient unbonded water molecules remain to permit high parasitic corrosion rates. The use of other alkaline electrolytes may require adjustment of these parameters to achieve optimum results.

TABLE B — Amides, Amines, Hydrazine

Ethyl amine
Propyl amine
Hydroxyl amine
Hydrazine
Ethylene diamine
Diethylenetriamine
Pyridine
Aniline
Dimethyl amine
Formamide
N-methyl-formamide
Dimethylformamide
Acetamide
N-methyl acetamide
N, N-dimethylacetamide
N-methyl propionamide These compounds may be used alone or in combination up to the saturation limits of the compounds in alkaline metal hydroxide electrolytes. No significant degradation of conductivity or reduced solubility for the anodic reaction products is evidenced at the saturation limit. A lower concentration limit is about 5 volume percent, below which hydrogen bonding is inadequate. The use of other alkaline electrolytes may require adjustment of these parameters to achieve optimum results.

TABLE C — Ketones, Ethers, Esters

Acetone
Ethyl methyl ketone
Diethyl ketone
Biacetyl
Ethyl ether
Tetrahydrofuran
Dioxan
Methyl formate
Methyl acetate These compounds may be used alone or in combination up to the saturation limits of the compounds in alkaline metal hydroxide electrolytes. No significant degradation of conductivity or reduced solubility for the anodic reaction products is evidenced at the saturation limits. A lower concentration limit is about 5 volume percent, below which hydrogen bonding is generally insufficient. The use of other alkaline electrolytes may require adjustment of these parameters to achieve optimum results.

It has been ascertained that certain compounds of the preceding classes will not serve a beneficial function due to weak hydrogen bonding or low solubility. In general, these compounds will manifest high melting points and will possess high molecular weights. Examples are hexanol, butylamide and hexanones.

Methanol, because of its superior hydrogen bonding features, was selected for extensive testing and evaluation. The results were obtained utilizing an electrochemical cell in accordance with the aforesaid patent, an electrolyte reservoir, a circulating pump, a temperature controlled bath for thermal control of the system and a wet gas volume meter for measuring evolved hydrogen.

For each run, samples of lithium metal were rolled to 0.25 inch thickness, cleaned with toluene, cut into a 1.5 inch diameter disc with a die and pressed upon the anode holder. The side and back of the assembled anode was insulated with a polystyrene lacquer. The cathode was formed from nickel screen 20 × 20 mesh with 0.020 inch diameter wire which was spot welded to 0.060 inch nickel rod spacers fastened to a nickel back plate. During runs electrolyte was circulated from the reservoir to the temperature bath through the cell and returned to the reservoir. A flow rate of 0.6 GPM was used in all experiments. The volume of hydrogen gas evolved during reaction was measured with an American Meter Co. Model 802 wet test meter with one liter volume per revolution. The electrical output, current and voltage, of the cell was recorded on a Varian model F-100 X-Y recorder. A cadmium, cadmium hydroxide reference electrode, positioned in the cell adjacent to the nickel cathode screen, was used to record anode and cathode voltage values as a function of current. The cell voltage and current were recorded on the X-Y recorder as the load was varied with a carbon pile resistor. The cell terminals include an electrical resistance so that the measured cell voltage is less than the true cell voltage $E_c$ and the voltages are related by the following expression:

$$E_c = E_m + IR$$

where $I$ is the cell current in amperes and $R$ is the anode to lead resistance in ohms, when measured by a resistance bridge. The resistance was found to be 0.024 ohms. The cell power was a maximum at 5.7 amp/in$^2$ (10 amperes current) or close to a true cell voltage of 1.0 volt.

Referring more particularly to FIG. 1, there is plotted the results of tests to determine electrolyte conductivity as a function of methanol concentration when added to 3.0 molar potassium hydroxide and 1.5 molar lithium hydroxide, even at 40 volume percent methanol, the conductivity of lithium hydroxide is as high as 0.076 ohm$^{-1}$cm$^{-1}$. This compares very favorably with typical conductivities of the electrolytes used in nonaqueous lithium batteries, for example, 10$^{-4}$ to 10$^{-3}$ ohm$^{-1}$cm$^{-1}$. Hence, the extent of degradation in conductivity is not sufficient to seriously reduce performance.

Figure 2:
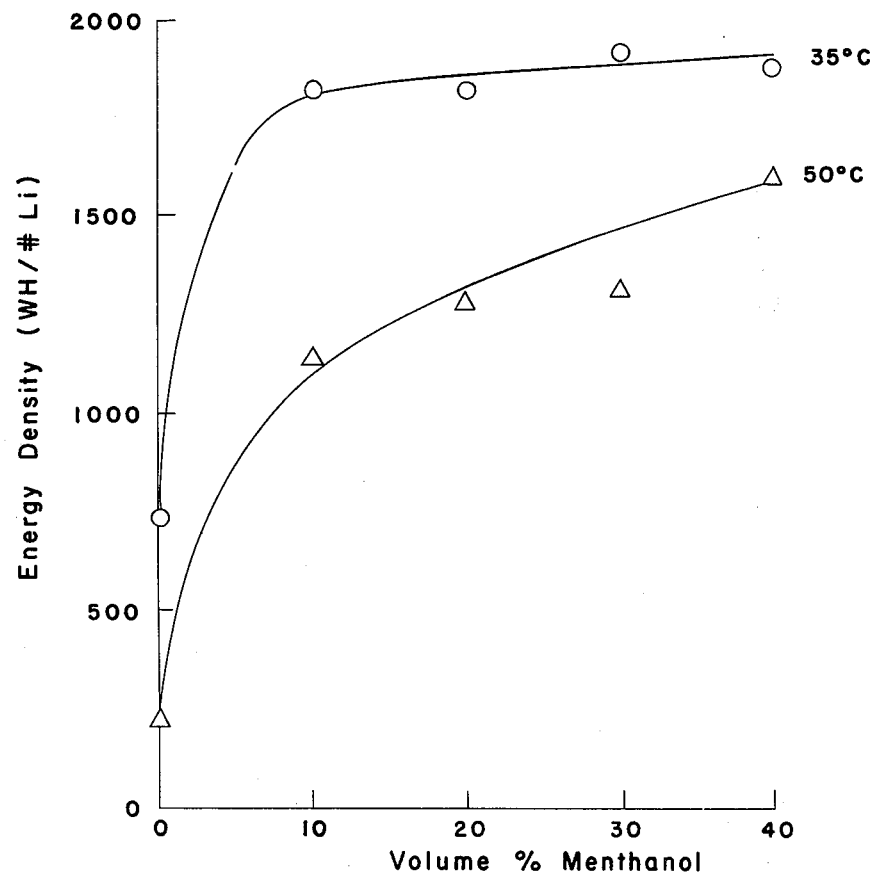
FIG. 2, on coordinates of energy density in watt hrs per pound lithium and volume percent methanol, is a plot showing improvements in energy density realized by additions of an illustrative organic solvent of the invention to the alkaline cell electrolyte.

In FIG. 2, there is plotted the dramatic improvement in energy density engendered by methanol additions to 3.0 molar potassium hydroxide maintained at 35° and 50°C, respectively. The highly desirable results accruing to this increase are as follows. When the alkali metal is reacting in the electrolyte about 4,000 watt hrs of energy are obtainable per pound of lithium. If the energy is not extracted as electricity, it is converted to heat via the direct corrosion reaction. The improvement in watt hrs per pound obtained with methanol is shown in the figure. In the absence of methanol, only about 300 watt hrs of electrical energy can be extracted per pound of lithium at 50°C in 3.0 molar potassium hydroxide and 800 watt hrs at 35°C. With 30 percent methanol addition, the electrical energy extraction increases to 1,300 and 1,700 watt hrs, respectively.

Figure 3:
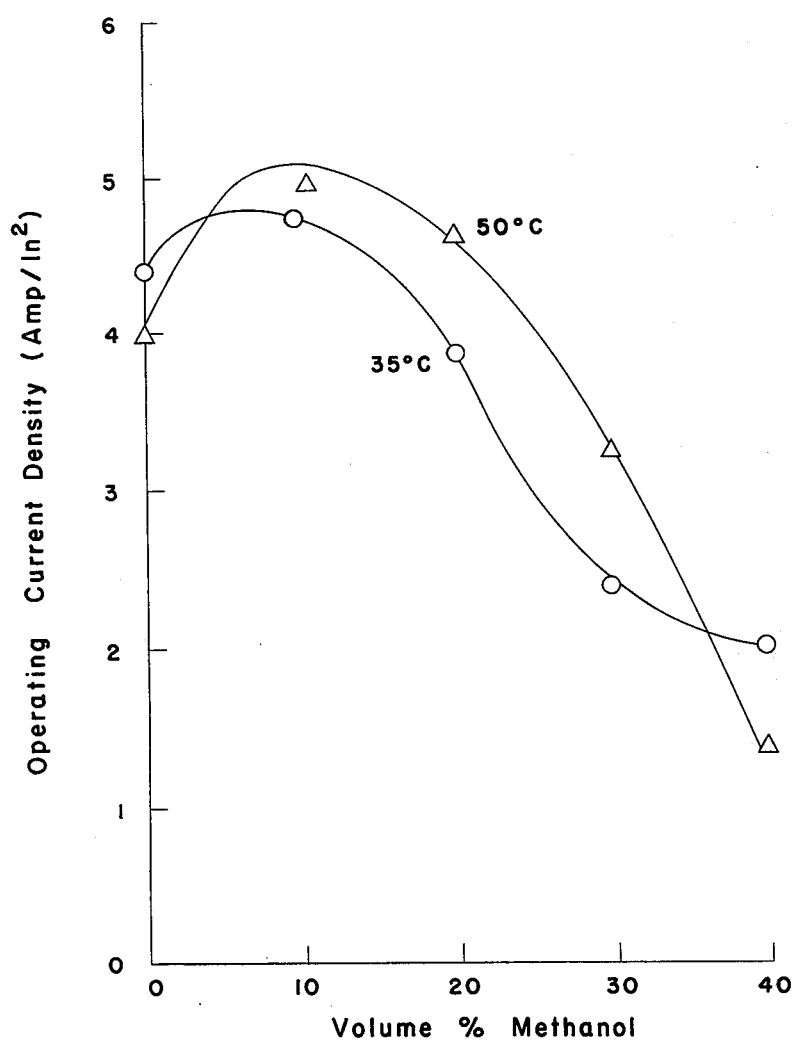
FIG. 3, on coordinates of operating current density in amperes per $in.^2$ and volume percent methanol, is a plot showing the effect of additions to the electrolyte of an illustrative organic solvent of the invention on current density.

In FIG. 3, there is plotted the effect on current density of methanol additions to 3.0 molar potassium hydroxide maintained at 35° and 50°C, respectively. The current density peaks at about 10 volume percent methanol and then decreases due to the reduction in electrolyte conductivity shown in FIG. 1. Even at the higher methanol concentrations, however, the densities are quite adequate for practical systems and have the advantages of low parasitic reaction as shown in FIG. 4.

Figure 4:
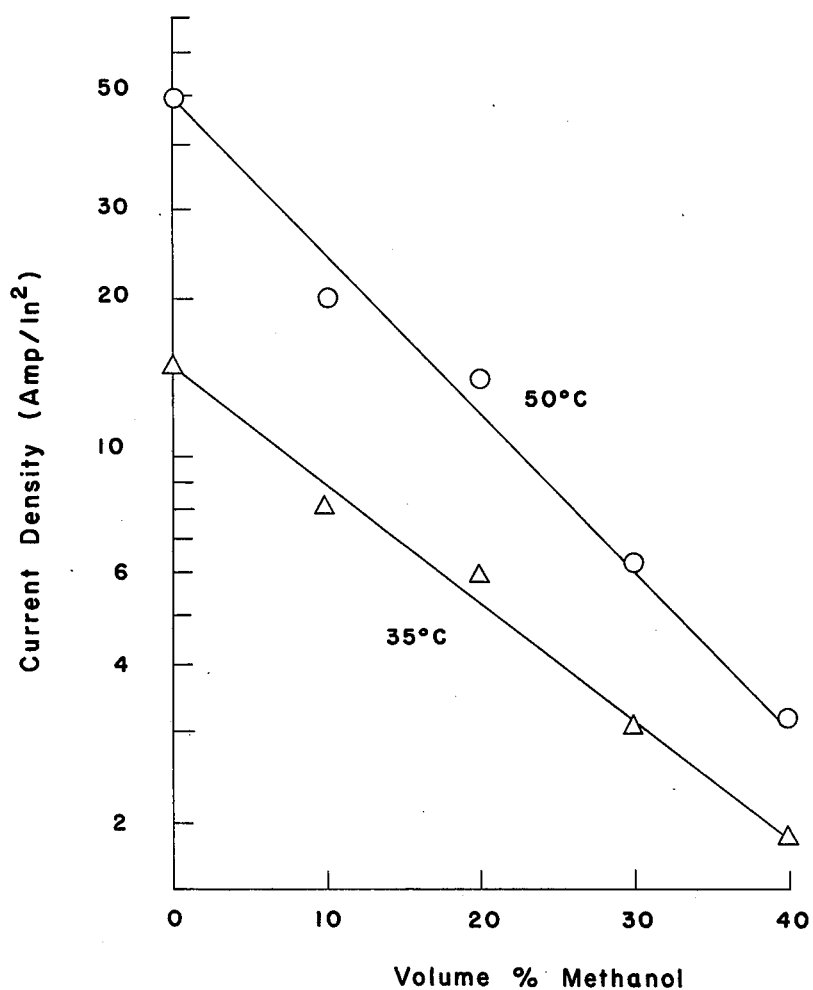
FIG. 4, on coordinates of current density in amperes per $in.^2$ and volume percent methanol, is a plot showing that increasing amounts in the electrolyte of an illustrative organic solvent of the invention reduces the parasitic reaction rate at open circuit voltage for the cell.

In FIG. 4, there is plotted the influence of increasing methanol concentrations in 3.0 molar potassium hydroxide on parasitic reaction rate at open circuit voltage and at different temperatures of 35° and 50°C, respectively. As shown, the reaction rate becomes negligible at the higher concentrations.

What is claimed is:

1. An electrochemical cell consisting essentially of a reactive metal anode highly reactive with water and spaced from a cathode by an electrically insulating film formed on said anode in the presence of water, an aqueous alkaline electrolyte in which said anode and cathode are immersed, said electrolyte permitting, at the anode, electrochemical dissolution of reactive metal to aqueous reactive metal ions, formation of an aqueous salt to a solid salt in the form of a porous film on the anode and, at the cathode, reduction of water, and an organic solvent in said electrolyte which reduces direct corrosion/parasitic reaction at said anode by hydrogen bonding with the water in said electrolyte while having only a minor inhibiting influence on said anode-cathode reactions, said organic solvent being at least one alcohol selected from the group of alcohols consisting of methyl alcohol, ethylene glycol, glycerol, ethyl alcohol, allyl alcohol and propyl alcohol.

2. An electrochemical cell in accordance with claim 1, wherein said alcohol is methanol present in an amount of from about 10 to about 40 volume percent.

3. An electrochemical cell in accordance with claim 1, wherein said electrolyte is an alkali metal hydroxide containing methanol.

4. An electrochemical cell consisting essentially of a reactive metal anode highly reactive with water and spaced from a cathode by an electrically insulating film formed on said anode in the presence of water, an aqueous alkaline electrolyte in which said anode and cathode are immersed, said electrolyte permitting, at the anode, electrochemical dissolution of reactive metal to aqueous reactive metal ions, formation of an aqueous salt to a solid salt in the form of a porous film on the anode and, at the cathode, reduction of water, and an organic solvent in said electrolyte which reduces direct corrosion/parasitic reaction at said anode by hydrogen bonding with the water in said electrolyte while having only a minor inhibiting influence on said anode-cathode reactions, said organic solvent being at least one amine selected from the group of amines consisting of ethyl amine, propyl amine, hydroxyl amine, ethylene diamine, diethylemetriamine, pyridine, aniline and dimethyl amine.

5. An electrochemical cell consisting essentially of a reactive metal anode highly reactive with water and spaced from a cathode by an electrically insulating film formed on said anode in the presence of water, an aqueous alkaline electrolyte in which said anode and cathode are immersed, said electrolyte permitting, at the anode, electrochemical dissolution of reactive metal to aqueous reactive metal ions, formation of an aqueous salt to a solid salt in the form of a porous film on the anode and, at the cathode, reduction of water, and an organic solvent in said electrolyte which reduces direct corrosion/parasitic reaction at said anode by hydrogen bonding with the water in said electrolyte while having only a minor inhibiting influence on said anode-cathode reactions, said organic solvent being at least one amide selected from the group of amides consisting of formamide, N-methyl-formamide, dimethylformamide, acetamide, N-methyl-acetamide, N,N-dimethylacetamide, and N-methyl propionamide.

6. An electrochemical cell consisting essentially of a reactive metal anode highly reactive with water and spaced from a cathode by an electrically insulating film formed on said anode in the presence of water, an aqueous alkaline electrolyte in which said anode and cathode are immersed, said electrolyte permitting, at the anode, electrochemical dissolution of reactive metal to aqueous reactive metal ions, formation of an aqueous salt to a solid salt in the form of a porous film on the anode and, at the cathode, reduction of water, and an organic solvent in said electrolyte which reduces direct corrosion/parasitic reaction at said anode by hydrogen bonding with the water in said electrolyte while having only a minor inhibiting influence on said anode-cathode reactions, said organic solvent being hydrazine.

7. An electrochemical cell consisting essentially of a rective metal anode highly reactive with water and spaced from a cathode by an electrically insulating film formed on said anode in the presence of water, an aqueous alkaline electrolyte in which said anode and cathode are immersed, said electrolyte permitting, at the anode, electrochemical dissolution of reactive metal to aqueous reactive metal ions, formation of an aqueous salt to a solid salt in the form of a porous film on the anode and, at the cathode, reduction of water, and an organic solvent in said electrolyte which reduces direct corrosion/parasitic reaction at said anode by hydrogen bonding with the water in said electrolyte while having only a minor inhibiting influence on said anode-cathode reactions, said organic solvent being at least one ketone selected from the group of ketones consisting of acetone, ethyl methyl ketone and diethyl ketone.

8. An electrochemical cell consisting essentially of a reactive metal anode highly reactive with water and spaced from a cathode by an electrically insulating film formed on said anode in the presence of water, an aqueous alkaline electrolyte in which said anode and cathode are immersed, said electrolyte permitting, at the anode, electrochemical dissolution of reactive metal to aqueous reactive metal ions, formation of an aqueous salt to a solid salt in the form of a porous film on the anode and, at the cathode, reduction of water, and an organic solvent in said electrolyte which reduces direct corrosion/parasitic reaction at said anode by hydrogen bonding with the water in said electrolyte while having only a minor inhibiting influence on said anode-cathode reactions, said organic solvent being at least one ether selected from the group of ethers consisting of biacetyl and ethy ether.

9. An electrochemical cell consisting essentially of a reactive metal anode highly reactive with water and spaced from a cathode by an electrically insulating film formed on said anode in the presence of water, an aqueous alkaline electrolyte in which said anode and cathode are immersed, said electrolyte permitting, at the anode, electrochemical dissolution of reactive metal to aqueous reactive metal ions, formation of an aqueous salt to a solid salt in the form of a porous film on the anode and, at the cathode, reduction of water, and an organic solvent in said electrolyte which reduces direct corrosion/parasitic reaction at said anode by hydrogen bonding with the water in said electrolyte while having only a minor inhibiting influence on said anode-cathode reactions, said organic solvent being at least one ester selected from the group of esters consisting of tetrahydrofuran, dioxan, methyl formate and methyl acetate.

\* \* \* \* \*